G. E. MITCHELL.
WINDSHIELD TOP FOR AUTOMOBILES.
APPLICATION FILED APR. 10, 1920.

1,435,490.

Patented Nov. 14, 1922.

Inventor:
George E. Mitchell
by his attorney, Charles L. Gooding

Patented Nov. 14, 1922.

1,435,490

UNITED STATES PATENT OFFICE.

GEORGE E. MITCHELL, OF HAVERHILL, MASSACHUSETTS.

WINDSHIELD TOP FOR AUTOMOBILES.

Application filed April 10, 1920. Serial No. 372,926.

*To all whom it may concern:*

Be it known that I, GEORGE E. MITCHELL, a citizen of the United States, residing at Haverhill, in the county of Essex and State of Massachusetts, have invented new and useful Improvements in Windshield Tops for Automobiles, of which the following is a specification.

This invention relates to an improved top for vehicles and is especially adapted for automobiles.

The object of the invention is to provide a top which will divert currents of air so that they will pass over the heads of the occupants of the automobile and out at the rear of the automobile and thus prevent said currents of air from blowing upon the occupants of the vehicle and interfering with their comfort.

It is well known that in driving an automobile drafts and currents of air are directed into the body of the vehicle and are especially objectionable in cold weather and that these currents of air directed against the back of the necks of people in the vehicle result frequently in sicknesses causes by said currents of air such as colds, headaches, stiff necks and the like.

The invention consists primarily in so constructing the top of the vehicle that currents of air which impinge upon the wind shield of the vehicle are directed upwardly therefrom and instead of passing directly through the body of the vehicle, they pass into a passage at the front of the vehicle adjacent the top thereof and after passing therethrough make their exit at the rear of the vehicle and this result is obtained by making the vehicle top of two members spaced apart to form a passage for air therebetween with an inlet opening at the front of the top and with an outlet opening at the rear of the top.

The invention further consists in the combination and arrangement of parts set forth in the following specification and particularly pointed out in the claims thereof.

Referring to the drawings.

Like numerals refer to like parts throughout the several views of the drawings.

Figure 1:
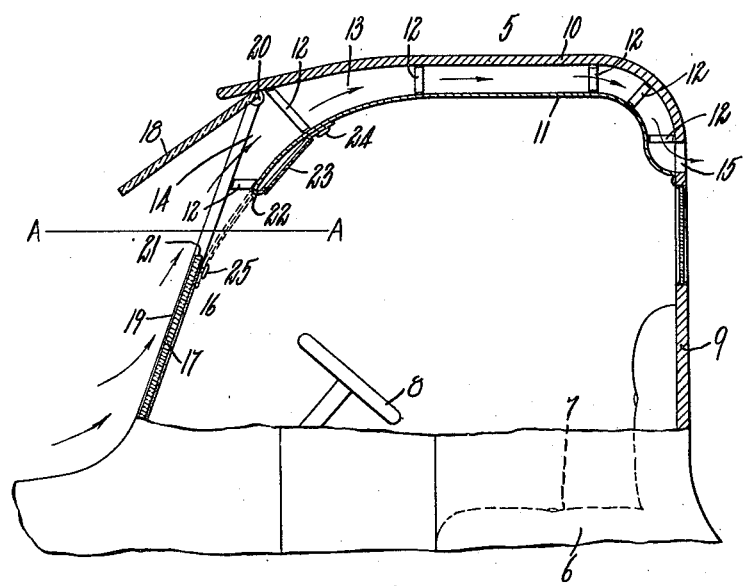
Figure 1 is a sectional elevation of a portion of an automobile top with my improved invention embodied therein.
Figure 2:
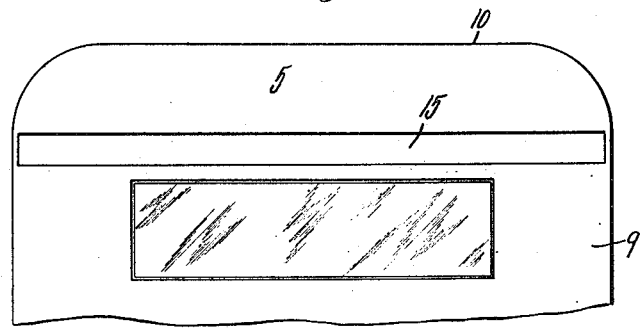
Figure 2 is a rear elevation of a portion of said top.

In the drawings, 5 is an auto top embodying my invention, 6 is a portion of the body of said vehicle, 7 the seat and 8 the steering wheel. The top 5 consists of a back 9, an outer member 10 and an inner member 11, said outer and inner members constituting the upper portion of the top 5. The inner member 11 is preferably made of flexible material and is suspended from the outer member 10 by straps 12, thus forming a passage 13 for air between the outer member 10 and the inner member 11. The passage 13 has an inlet opening 14 at the front of the top and an outlet opening 15 at the rear of the top. 16 is a wind shield preferably consisting of two parts 17 and 18 which are supported upon a suitable frame 19 in a manner well known to those skilled in the art. The upper part 18 is preferably pivoted at 20 to said frame and may be positioned at different angles and clamped in position in the usual manner.

While it is preferable to use a wind shield made in two parts as described, the upper part 18 may be omitted if so desired. The upper edge 21 of the wind shield 17 is located beneath and preferably in advance of the lower edge 22 of the inlet opening 14 of the passage 13 so that the space between the lower edge 22 of the opening 14 and the upper edge 21 of the wind shield 17 allows an unobstructed and clear view to be obtained by the occupants of the vehicle through said space and approximately along the line of vision A—A. This space may, however, when desired be closed by means of a curtain 23 which is made of flexible material, preferably transparent, and is so constructed that it may be held in elevated position and out of alignment with the space between the edge 22 and the upper edge 21 of the wind shield by fastening devices 24 and said curtain 23 may be held in lowered position to close said space as shown in dotted lines, Figure 1, by fastening devices 25.

The general operation of the device hereinbefore specifically described is as follows: Assuming the several parts to be in the positions illustrated in full lines, Figure 1, the currents of air impinge against the wind shield 17 and are directed upwardly therefrom as illustrated by the arrows in said figure, past the space between the lower edge 22 of the opening 14 and the upper edge 21 of the wind shield 17 and through the inlet opening 14 along the passage 13, over the heads of the occupants of the vehicle and downwardly through the outlet opening 15 at the rear of the vehicle. In case of bad weather such as rain or snow, the curtain 23 can be dropped from the position shown in full lines, Figure 1, to the position shown in dotted lines and fastened in the lower position by means of the fastening devices 25.

I claim:

1. A vehicle having, in combination, a top embodying an outer member and an inner member spaced apart to form an air passage therebetween, means closing the opposite sides of said passage which has an inlet opening at the front and an outlet opening at the rear of said top, and a wind shield located beneath said inlet opening with its upper edge in advance of the lower edge of said inlet opening and adapted to direct air thereinto.

2. A vehicle having, in combination, a top embodying an outer member and an inner member spaced apart to form an air passage therebetween, means closing the opposite sides of said passage which has an inlet opening at the front and an outlet opening at the rear of said top, and a wind shield in two parts, one of said parts being located above the other and adapted to be adjusted to provide a space between its lower edge and the upper edge of the other of said wind shield parts, one of said parts being located beneath said inlet opening whereby currents of air may be directed into said inlet opening.

3. A vehicle having, in combination, a top embodying an outer member and an inner member spaced apart to form an air passage therebetween, means closing the opposite sides of said passage which has an inlet opening at the front and an outlet opening at the rear of said top, and a wind shield located beneath said inlet opening with a space between the upper edge thereof and the front edge of said inner member, and means to close said space.

4. A vehicle having, in combination, a top embodying an outer member and an inner member spaced apart to form an air passage therebetween, means closing the opposite sides of said passage which has an inlet opening at the front and an outlet opening at the rear of said top, and a wind shield located beneath said inlet opening with a space between the upper edge thereof and the front edge of said inner member, and adapted to direct air through said inlet opening and into said air passage, and a curtain supported upon said inner member adjacent the front edge thereof, and means to fasten said curtain in an elevated position and out of alignment with said space.

In testimony whereof I have hereunto set my hand in presence of a subscribing witness.

GEORGE E. MITCHELL.

Witness:
FRANKLIN E. LOW.